United States Patent [19]
Chattaway et al.

[11] 3,884,811
[45] May 20, 1975

[54] FILTER

[75] Inventors: George Anthony Chattaway, Meriden; Arthur James Pearson-Coleman, Warwick, both of England

[73] Assignee: Vortex (Fishery Equipment) Ltd., England

[22] Filed: June 25, 1974

[21] Appl. No.: 482,931

Related U.S. Application Data

[63] Continuation of Ser. No. 324,952, Jan. 19, 1973, abandoned.

[52] U.S. Cl. ................ 210/169; 15/246; 210/408; 210/413; 210/433
[51] Int. Cl. ............................................ E04h 3/20
[58] Field of Search ............ 15/77, 246; 210/27, 79, 210/81, 159, 162, 169, 173, 388, 389, 396, 405, 409, 413, 433, 456

[56] References Cited
UNITED STATES PATENTS
2,776,755  1/1957  Craig ........................ 210/456 X
2,824,320  2/1958  Teel .............................. 15/77
3,252,573  5/1966  Assinck et al. ............ 210/389 X FOREIGN PATENTS OR APPLICATIONS
224,478  9/1908  Germany ..................... 210/415

*Primary Examiner*—Samih N. Zaharna
*Assistant Examiner*—Robert G. Mukai
*Attorney, Agent, or Firm*—A. Yates Dowell, Jr.

[57] ABSTRACT

A filter comprises a water permeable screen supported over a receiver and inclined to the horizontal. A header is provided for discharging water onto the upwardly presented surface of the screen at a rate such that the major part of the water passes into the receiver and a minor part of the water carries solid matter retained on the screen to the lower edge thereof. Brushes are provided for sweeping over the upwardly and downwardly presented surfaces of the screen to dislodge solid matter therefrom. The filter is primarily intended for filtering water withdrawn from a fish tank before returning the water to the tank.

4 Claims, 4 Drawing Figures

FILTER

This is a continuation of application Ser. No. 324,952, filed Jan. 19, 1973, now abandoned.

BACKGROUND OF THE INVENTION

This invention relates to a filter and method of filtering which have been developed primarily for use in filtering water in which fish are reared. The expression "fish" is used herein generically to include creatures which are able to live under water, whether saline or non-saline.

Methods of rearing fish on a commercial scale as a source of food generally termed "fish farming," have been proposed, for example, in U.S. Pat. No. 3,638,616 to W.J. Carmouche, in which the fish kept captive in a body of water and a flow of water through the body is maintained by admitting water to the body continuously from a supply source and continuously discharging water from the body to carry away pollutants. The discharged water is discarded. An object of these prior proposals is that water should be discharged from the body containing the fish at a rate sufficient to avoid accumulation of pollutants in this body to a level such that the well being of the fish is impaired. It is evident that, to achieve this object, the rate at which water is discarded must be increased with the quantity of fish kept in the body of water, and the fish can be stocked at high densities only where there is available a water supply from which water can be drawn at a high rate to permit a high rate of discharge.

A further disadvantage of these previously proposed methods of fish farming is that the body of water containing the fish cannot economically be maintained at a temperature significantly above the ambient temperature, since any heat supplied to the water would be continuously carried away by water being discharged. Since the growth rate of fish is dependent upon temperature, in many cases it is advantageous to maintain the body of water containing the fish at a temperature above the ambient temperature.

It is also known to rear fish in aquaria. Aquaria are known in which water is continuously withdrawn from the fish tank, passed through a body of a filter medium, and returned to the fish tank. Such apparatus enables the concentration of solid pollutants in the water of the fish tank to be maintained at a low level and enables the water to be maintained economically at a temperature above the ambient temperature.

It would not be practicable to carry out fish farming in this known form of aquarium, since the economic production of fish as a source of food requires a much higher stocking density than could be maintained in the known form of aquarium. If the fish were reared in this form of aquarium at a stocking density suitable for fish farming, pollutants would be generated at a rate such that a filter of the kind used in conventional aquaria would rapidly become clogged with solid pollutants, thus requiring frequent renewal of the filter medium.

A further serious disadvantage of the known form of aquarium referred to above is that water is circulated continuously through the solid pollutants retained on the filter medium, and thus soluble pollutants are extracted from the solid pollutants and returned to the fish tank. This would be unacceptable in fish farming since it would increase the difficulty of avoiding an unacceptably high concentration of dissolved pollutants in the water.

It is an object of the present invention to provide a filter suitable for filtering water circulated from a fish tank through the filter, whereby a high stocking density can be maintained with a relatively low rate of discharge of water from the system.

SUMMARY OF THE INVENTION

According to the present invention there is provided a filter comprising a receiver for receiving filtered liquid, a water permeable screen supported over the receiver and inclined to the horizontal, and means for discharging onto an upwardly presented surface of the screen liquid which is to be filtered, whereby water passing through the screen can enter the receiver but solid matter which cannot pass through the screen is carried to a lower margin of the screen and is prevented from entering the receiver.

With this arrangement, solid matter separated by the filter from the water is removed from the flow path of water. Furthermore, the water which is discharged onto the screen assists with removable of solid matter from the screen.

BRIEF DESCRIPTION OF THE DRAWINGS

The invention will now be described, by way of example, with reference to the accompanying drawings wherein.

DETAILED DESCRIPTION

Figure 1:
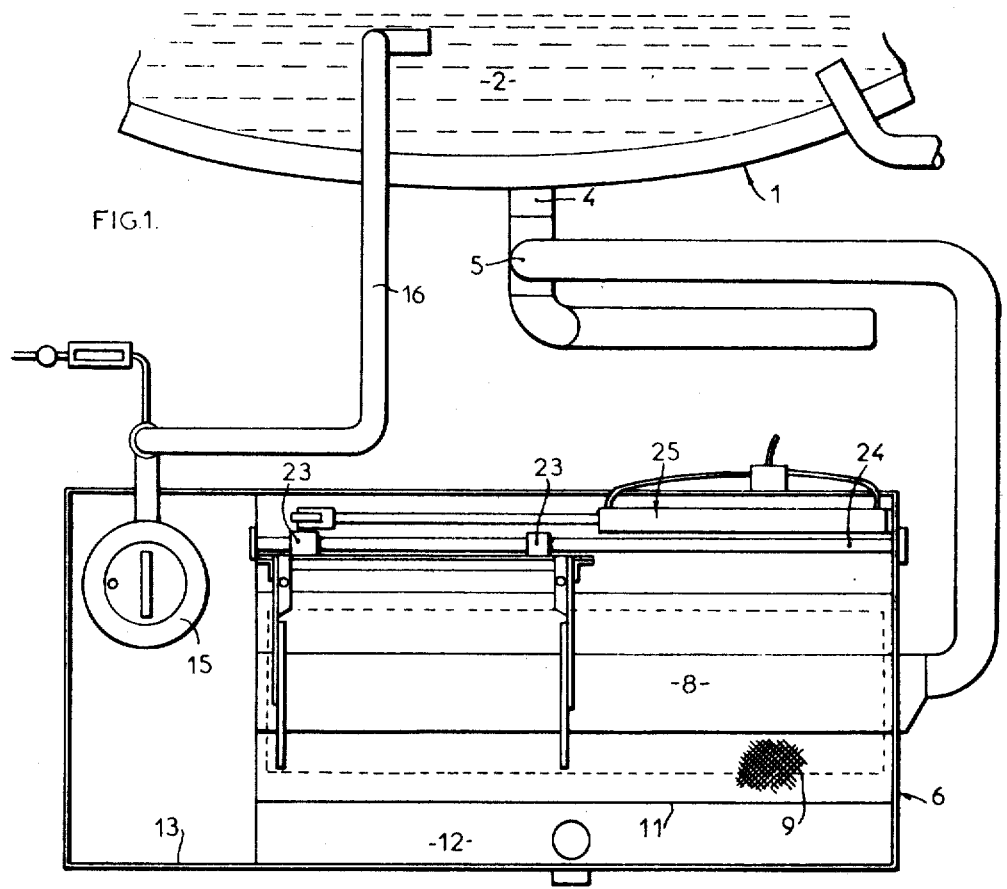
FIG. 1 illustrates in plan view a filter in accordance with the invention, together with pipe work connecting the filter with a fish tank, only a part of the latter being shown.
Figure 2:
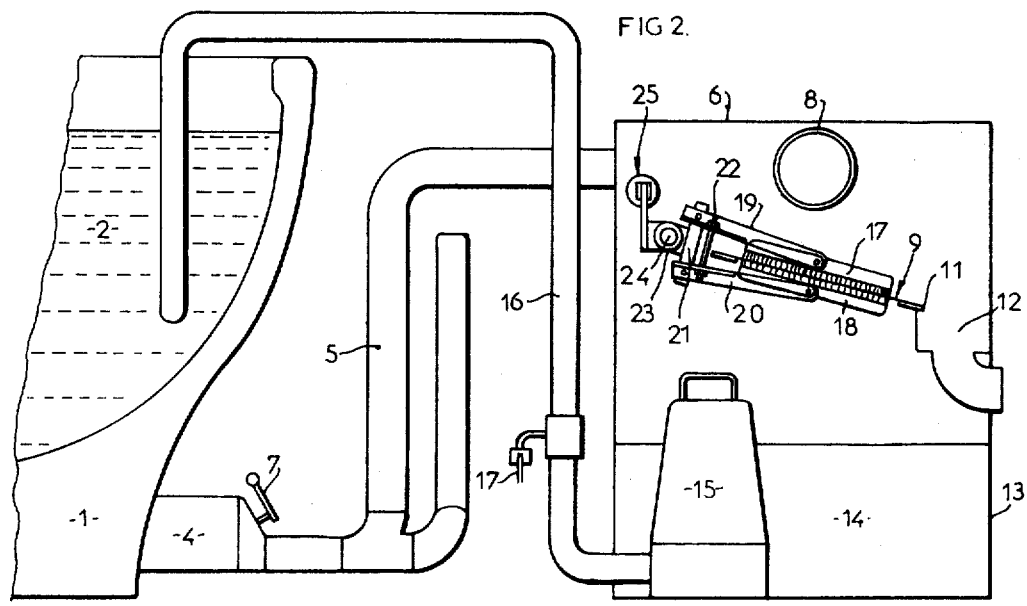
FIG. 2 shows the apparatus of FIG. 1 in end elevation, an end wall of the filter being omitted to reveal internal parts of the filter.

The apparatus illustrated in FIGS. 1 and 2 comprises a circular fish tank 1, only a part of which is shown, which may be of the design generally referred to as the "Swedish tank." The tank contains a body of water 2, in which fish to be reared would be maintained captive. A central outlet opening (not shown) is formed in the floor of the tank and is connected by a horizontal pipe 4 and a vertical pipe 5 with a filter indicated generally at 6 as shown in FIG. 2, the pipes 4 and 5 are both disposed entirely below the upper surface of the body 2 of water so that water will flow gravitationally from the fish tank 1 to the filter 6. The pipe 4 contains a manually operable valve 7, whereby the flow of water to the filter can be terminated in the event of, for example, the filter developing a leak.

The filter 6 comprises a horizontal header pipe 8 which is mounted above an inclined water permeable screen 9. The header pipe is connected at one of its ends with the vertical pipe 5, the other end of the header pipe being closed. A series of apertures are formed along the header pipe so that water can be discharged therefrom onto the screen 9.

The screen 9 is formed of a woven fabric such that water can pass through the screen but solid matter carried by the water which is discharged from the header pipe 8 onto the upwardly presented surface of the screen does not pass through. As a result of the inclination of the screen, such solid matter is carried down the screen towards the lower margin 11 thereof and is eventually discharged from the lower margin into a channel 12 which extends along the length of the screen 9 beneath the lower margin thereof.

The size of the apertures may be selected, in relation to the area and slope of the screen 9 and the area of intestices between the filaments thereof to provide that a small proportion of the water discharged from the header pipe 8 will flow down the screen and be discharged from the lower margin thereof so as to assist movement of solid matter down the screen.

The apertures may each be long, relatively narrow slits, in which case each slit would extend circumferentially of the pipe 8 and would be spaced from each other lengthwise of the header pipe. Alternatively, the header pipe may be formed with a plurality of rows of circular apertures, each row extending lengthwise of the pipe, the apertures of each row being spaced from one another and in alignment with the apertures of the other rows. With either of these arrangements, water is discharged from the header pipe 8 in a plurality of streams which are spaced from one another across the slope of the screen 9. Solid matter discharged with the water from the header pipe 8 is displaced from the position of impact of each of these streams to positions between adjacent streams. Accordingly, alternate strip-like areas of the screen which extend down the slope thereof are kept relatively clear and bear accumulations of solid matter, respectively. The upper surface of the screen is not entirely covered by solid matter and filtered water can readily pass through the screen.

The filter comprises an outer casing 13 within which the header pipe 8 and screen 9 are disposed. A lower part of the casing defines internally a reservoir 14 for receiving the filtered water. The channel 12, also situated within the casing 13, is arranged to prevent solid matter which does not pass through the screen from entering the reservoir. A pump 15 also disposed within the casing 13 is arranged to draw water from the reservoir 14 and pumps same through a pipe 16 back to the fish tank 1.

The apparatus further comprises brushes for sweeping the upwardly and downwardly presented surfaces of the screen 9 to prevent clogging thereof. An upper and a lower brush 17 and 18 respectively are provided, these brushes extending down the slope of the screen 9 and being pivotally mounted on respective arms 19 and 20 which in turn are pivotally mounted on a common carrier 21. As shown in FIG. 1, a further pair of brushes 17 and 18 and associated arms 19, 20 may be provided at a position spaced longitudinally of the screen 9 from the first pair of brushes. The arms of this second pair of brushes are also mounted on the carrier 21. The arms 19 and 20 are connected, at a position spaced from the carrier 21, by a bolt and nut 22 whereby the pressure exerted by the brushes on the screen can be adjusted.

The carrier 21 is mounted by means of bushes 23 on a rod 24 which extends lengthwise of the screen 9. The piston rod of a pneumatic piston and cylinder unit 25 is connected to one of these bushes, the cylinder being connected to the casing 13. An automatic control valve of known construction is provided for delivering air under pressure alternately to opposite ends of the cylinder to cause the brushes 17 and 18 to reciprocate continuously along the screen 9.

The pipe 16 terminates in one or more orifices which are disposed well below the surface of the body of the water 2 in the fish tank 1, so that a pressure substantially above atmospheric pressure can be maintained in the pipe 16. An oxygen delivery pipe P communicates with the pipe 16 near to the filter 6 so that oxygen under pressure can be introduced into the water returning from the filter to the fish tank. The pressure within the pipe 16 is maintained sufficiently high to cause such oxygen to dissolve in the water and be carried thereby into the fish tank.

The orifices at the outlet end of the pipe 16 are so arranged that when water is delivered therefrom to the fish tank, the body of water 2 is caused to flow along a spiral path around the tank 1 and eventually to the centre of the tank where it flows into the pipe 4. Such spiral flow of water distributes throughout the body of water 2 that oxygen which is dissolved in water returning to the fish tank from the filter 6.

Referring now to the filter shown in FIG. 3, parts therein which correspond to those previously described with reference to FIGS. 1 and 2 are indicated by like reference numerals with the prefix 5, and the preceding description is deemed to apply.

Figure 3:
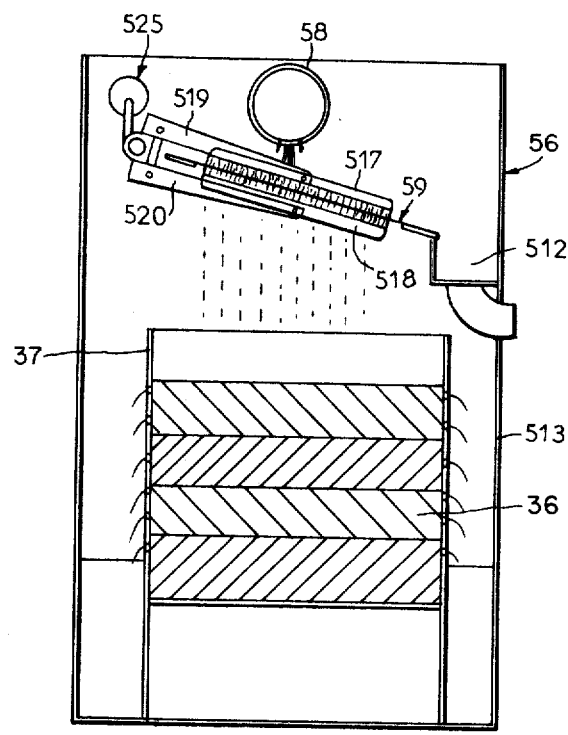
FIG. 3 illustrates in vertical cross section a modification of the filter shown in FIG. 2 in which a filter bed is provided within the filter.

The filter illustrated in FIG. 3 differs from that in FIGS. 1 and 2 by the provision, within the casing 513, of a bed 36 of filter material. This bed is contained in an open-topped housing 37 which is arranged beneath the screen 59 to receive the filtered water passing therethrough.

The bed 36 is preferably composed of filter material of a particulate nature and may, for example, be charcoal. The filter bed 36 separates from the water flowing therethrough any small quantities of solid matter which manage to pass through the screen 59. However, the filter bed will not clog rapidly since the quantity of solid matter which passes through the screen will be, at worst, very small.

The filter bed 36 may be adapted to provide suitable conditions for the growth of bacteria, for example nitrifying bacteria, which act on soluble pollutants in the filtered water to convert same to substances which are less harmful to fish.

Water which flows through the filter bed 36 flows into a reservoir defined by the lower part of the casing 513 and is pumped therefrom to the fish tank, as described with reference to FIGS. 1 and 2.

Figure 4:
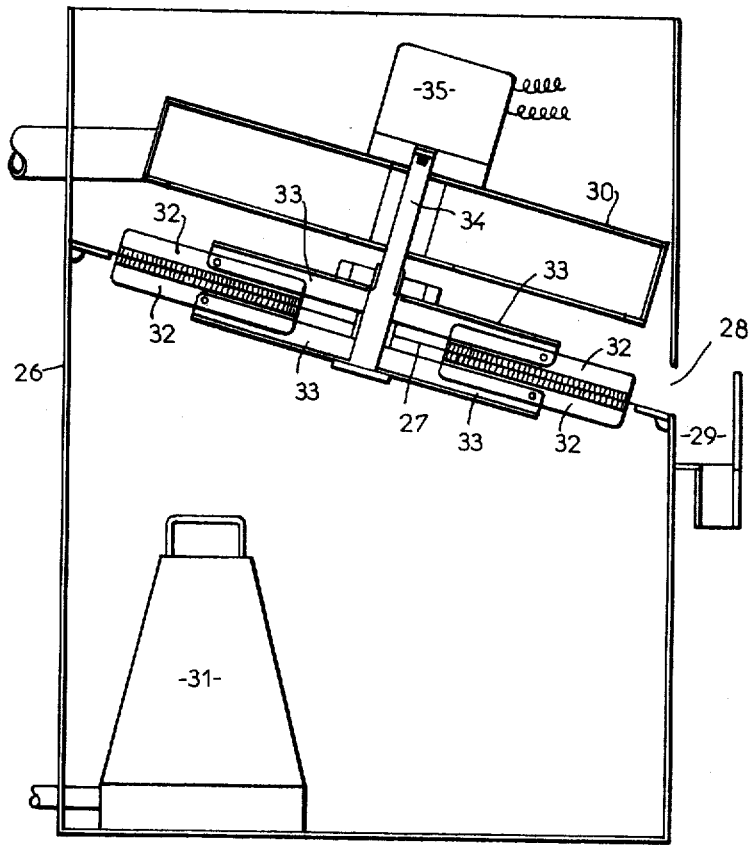
FIG. 4 illustrates in vertical cross section an alternative form of filter which may be connected by the pipe work shown in FIGS. 1 and 2 with the fish tank, this alternative form of filter having a circular screen and a rotary brush.

The further alternative form of filter shown in FIG. 4 comprises an open-topped cylindrical casing 26 which is divided into upper and lower parts by a screen 27 which may be formed of the same material as the screen 9 referred to with reference to FIGS. 1 and 2. The screen 27 is inclined to the horizontal.

Adjacent to the lower margin of the screen 27, the casing 26 is formed with an opening 28, through which solid matter can be discharged from the upwardly presented surface of the screen 27 into a channel 29.

Above the screen 27 there is mounted a header 30 formed in its underside with a row of slits, each of which extends in a direction down the slope of the screen 27 and which are spaced apart in a direction across the slope of the screen 27. Alternatively, the header may be formed at its underside with a plurality of rows of apertures, each row extending in a direction across the slope of the screen and the apertures of the row being spaced apart from one another, and being aligned with, in a direction down the slope of the screen, corresponding apertures of other rows.

A pump 31 is disposed within the lower part of the casing 26 for pumping water from a reservoir at the bottom of the casing out of the filter to a fish tank or other point of use.

Two pairs of brushes 32 are provided for brushing the upwardly and downwardly presented surfaces of the screen 27 to prevent clogging of the latter. The pairs are mounted at diametrically opposite positions with respect to the centre of the screen 27, one brush of each pair being arranged to brush the upwardly presented surface and the other brush being arranged to brush the downwardly presented surface. The brushes are carried on respective arms 33 which project radially from a drive shaft 34 carried on the output shaft of an electric motor 35.

When the filter is in use, the motor 35 is operated continuously to drive the brushes 32 around the screen 27. Water is discharged from the header 30 onto the screen in a plurality of streams which are spaced apart in a direction across the slope of the screen. Solid matter carried by the water discharged from the header accumulates on strip-like portions of the screen between the streams of water and is carried to the lower edge of the screen by a small proportion of the water discharged from the header, which small proportion flows into the channel 29 with the solid matter. Any solid matter which is not readily carried down the screen by the water is dislodged by the brushes 32.

It will be noted that each of the forms of filter hereinbefore described promotes extensive contact between the water and the surrounding atmosphere. Such extensive contact assists transfer of volatile pollutants, for example carbon dioxide and ammonia, which are dissolved in the water to the atmosphere.

We claim:

1. Apparatus for removing solid materials from the liquid of a fish tank comprising a filter housing, an inclined liquid permeable screen means fixed within said housing and having upper and lower surfaces, means for removing liquid from said fish tank and discharging the liquid onto the upper surface of said inclined screen means so that a major portion of the liquid filters through said screen means and a lesser portion of the liquid flushes solid materials down the inclined upper surface of said screen means, means for receiving said lesser portion of liquid and solid materials and discharging the same from said housing, carrier means located within said housing adjacent to said screen means, a first brush means pivotally mounted on said carrier means for engaging the upper surface of said screen means, a second brush means pivotally mounted on said carrier means for engaging the lower surface of said screen means and substantially beneath said first brush means, means for moving said carrier means and said first and second brush means along said screen means in a direction transverse to the slope of the screen means adjusting means interconnecting said first and second brush means for adjusting the pressure of said first and second brush means relative to the upper and lower surfaces of said screen means so that the pressure applied to the screen means by both brush means is substantially the same, receiver means located below said screen means for receiving filtered liquid passing therethrough, and means for returning the filtered liquid from said receiver means to said fish tank.

2. The structure of claim 1 in which each of said first and second brush means includes an arm pivotally mounted at one end on said carrier means, a brush pivotally connected to the opposite end of each arm in a position to engage said screen means, and said adjusting means interconnects said arms.

3. The structure of claim 1 in which said means for discharging the liquid onto the upper surfaces of said inclined screen means includes a header having a plurality of spaced apertures so that the liquid is discharged onto the upper surface of said screen means in a plurality of spaced streams.

4. The structure of claim 3 in which said header means is disposed generally parallel to said screen means.

* * * * *